Patented June 16, 1953

2,642,405

UNITED STATES PATENT OFFICE 2,642,405

FIRE-RETARDING COATING COMPOSITION COMPOSED OF NITROGEN-PHOSPHORUS COMPOUND WITH AN ALDEHYDE RESIN

Morris L. Nielsen, Dayton, Ohio, assignor to Monsanto Chemical Company, St. Louis, Mo., a corporation of Delaware No Drawing. Application December 30, 1948, Serial No. 68,403

5 Claims. (Cl. 260—29.4)

The present invention is directed to fire-retarding coatings and to a method of manufacture thereof.

It is an object of the invention to provide paints which may be utilized as surface coatings on wood and other combustible materials to render such materials resistant to fire.

It is another object to provide a novel method of manufacturing interior and exterior surface-protective coatings which are resistant against weather and wear as well as against fire.

It has been known in the art that certain inorganic phosphate salts have utility in the formulation of fire-proofing compositions, but it has been a disadvantage of such inorganic salts that only a small proportion of the same could be incorporated into surface-protective coatings such as paints, since these phosphate salts resulted in the formation of rough coating films. Moreover, large amounts of the salts had to be employed to obtain a flame-resistant effect. In addition, the water-solubility of most such salts resulted in rapid washing out of the flame-proofing agent when in contact with water.

It has now been found that fire-retarding compositions of great stability may be provided by the combination of a water solution or dispersion of an aminoplast condensation product or resin and a chemical compound containing nitrogen and phosphorus. The nitrogen-phosphorus-containing component may be a condensation product of ammonia and phosphoryl chloride. One type of such compounds is described by Mellor in Comprehensive Treatise on Inorganic and Theoretical Chemistry, 8, 713 (Longmans, Green and Company, New York, 1928).

A preferred compound obtainable from the reaction product of ammonia and phosphoryl chloride by heat treatment thereof is the insoluble, infusible composition which has been designated as polyphosphorylamide. The preparation of the water-insoluble polyphosphorylamide is described in copending application, Serial No. 68,402, filed December 30, 1948, which application is assigned to the same assignee as is the present application. The process is most conveniently carried out by passing gaseous ammonia into a solution of phosphorus oxychloride (also called phosphoryl chloride) dissolved in a hydrocarbon solvent boiling above 200° C. until at least 5 moles of ammonia per mole of phosphorus oxychloride have been added and combined therewith. It has been found that a definite compound is formed at this stage, although more ammonia may be added. The reaction is best carried out at temperatures below 100° C. and preferably above 20° C., utilizing normal pressure or elevated pressure. Since exothermic reaction heat is liberated it is desirable to cool the hydrocarbon solution during the reaction in order to maintain the temperature thereof between the above limits. The product formed by this initial reaction is a fine, white powder which consists of a mixture of a nitrogen-phosphorus containing body and ammonium chloride. The nitrogen-phosphorus containing body is at this stage water-soluble and alkaline in reaction. If desired, the reaction product may now be separated by filtration or by centrifuging from the hydrocarbon and the separated product treated according to the second step of my process.

Preferably the heating step may be carried out upon the reaction product produced by the first step while the product is still suspended or mixed with the original hydrocarbon solvent. This results in better yields and simplified operation, since the material may be handled more easily and without losses. The second step of my process involves heating the product produced in the first step to a temperature above 155° C., but below a temperature of 250° C., either at atmospheric or superatmospheric pressure. During the heating period, a small amount of ammonia is evolved which may be recovered and reused in the process. During the heating step the nitrogen-phosphorus product apparently undergoes a polymerization or molecular rearrangement, being converted thereby into a water-insoluble product of higher molecular weight.

Example A

One hundred parts of phosphoryl chloride was dissolved in 300 parts of kerosene of commercial grade. The kerosene had a boiling range of about 150° to 260° C. Anhydrous ammonia gas was then passed into the kerosene solution at a slow rate of addition, and simultaneously therewith, the solution was cooled in order to maintain the temperature below about 80° C. At the same time, efficient agitation of the solution was maintained. The addition of ammonia was continued in this manner until 5 moles of ammonia had been reacted with the phosphoryl chloride. The reaction product was insoluble in kerosene and appeared as a white powder suspended therein.

After completion of the ammonia addition, the reaction mixture, while remaining suspended in kerosene, was heated to a temperature of 200° C.

After the temperature had reached 200° C., heating was discontinued and the mixture permitted to cool. During the heating period, some ammonia was evolved, the nitrogen-phosphorus product apparently undergoing polymerization and becoming water-insoluble. At the end of the heating period, which may be carried out for a period of from one-fourth to three hours, preferably one to three hours, the solids were removed from the kerosene by filtration or centrifuging. The product was next washed with water in sufficient amount so as to dissolve the ammonium chloride present in the product. The washing operation may also be followed by a heating step which is designed to dry the product and also to remove traces of the kerosene or other hydrocarbon. A convenient method for removing the hydrocarbon consists in steaming the product while it is contained in a rotating centrifuge.

The nitrogen-phosphorus containing product, resulting from the present process, is substantially insoluble in water as well as organic solvents. It may be suspended or dispersed in water and will then exhibit a pH which is substantially neutral or alkaline in reaction. The final product is free from chlorine as a result of the heating and polymerization step, which makes it possible for the ammonium chloride to be completely removed to leave only the condensation product consisting essentially of nitrogen, oxygen, hydrogen and phosphorus. The nitrogen-phosphorus atomic ratio is approximately 1.80:1, but may be varied within the range of 1.5:1 to 2.0:1 by variation of the amount of $NH_3$ initially reacted with the $POCl_3$ and this product to some degree polymerized, and then subjected to heating as described above, to complete the polymerization. The polyphosphorylamide is a white powder, insoluble in water, and having a substantially neutral or alkaline reaction. The nitrogen-phosphorus atomic ratio of the polymeric material lies in the range of 1.75:1 to 1.85:1, which relatively high range represents a product desirable in providing a composition which, in the presence of nitrogen-containing resins such as aminoplasts, bulks up by releasing nitrogen compounds as gases when exposed to fire.

The result is that when exposed to heat the entire coating composition swells and provides a porous, puffy, insulating layer, thereby protecting the base material which may be wood or other combustible cellulosic material such as straw, fabric and the like.

The nitrogen-containing resins contemplated in the present invention are known as aminoplasts. As is well known, aminoplasts are resins derived from amino (including imino) or amido (including imido) compounds, a typical example being urea-formaldehyde resin (reference: Modern Plastics, 17, 433, 1939). Other aminoplasts, described in C. Ellis, Chemistry of Synthetic Resins, chapter 26, (Reinhold Publishing Company, 1935) and R. Nauth, Chemistry and Technology of Plastics, chapter 3, (Reinhold Publishing Company, 1947), may be employed in the combination composition of the present invention. Examples are the formaldehyde condensation products with urea, melamine, thiourea, guanidine, cyanamide, dicyandiamide, aniline, p-toluene sulfonamide, and also the corresponding acetaldehyde and furfural condensation products in the same relationship. Such resinous compositions may employ high, medium or low degrees of methylolation (or the corresponding acetal or furfural substituents) such, for example, as from 1 to 5 methylol radicals per mole of the acceptor compound in the case of melamine. The use of the alkylated modifications of such resins is likewise contemplated, particularly in the butylated modifications such as are conventional in urea-formaldehyde and melamine-formaldehyde resins. Mixtures of such resins, or the addition of other types of resins, may also be carried out.

In addition to the synthetic type of resins, as set forth above, it is also possible to supplement them by the utilization of nitrogen-containing, resinous materials derived from natural sources, such as casein. The casein compositions insolubilized by formaldehyde are of particular utility for this purpose. Other polyamide resins which may be brought into solution or dispersion for use in the present compositions, may also be introduced into the formulations of the present invention.

In the embodiment of the invention as a water paint, dispersion or emulsion, it is desirable that the resinous constituent or condensation product be water-soluble. For this purpose the intermediate stage of resinification of the condensation product is preferably employed. Upon application of the fire-retardant material comprising the nitrogen-containing resin in combination with the reaction product of phosphoryl chloride and ammonia, the resin forms a continuous surface film in which the phosphorus compound is dispersed. In this form the combination composition is potentially available in the event of exposure to a fire, in which event a chemical reaction between the constituents takes place, releasing gases and forming by intumescence a heat-insulating and fire-retarding char which prevents the otherwise combustible base material from burning.

In accordance with this invention a paint formulation is provided in the form an an aqueous dispersion rather than a complete solution so that the coating composition thus made will dry and harden rapidly, and will be insoluble after drying. More specifically, the fire-retarding paint or coating composition may be formulated with the following components:

1. Polyphosphorylamide or other reaction products of ammonia and phosphoryl chloride: 5% to 50% by weight based upon the weight of solids.

2. An aminoplast resin. The aminoplast may be used in the range of 1 to 4 parts by weight of resin to 1 part of the polyphosphorylamide, a preferred range being 2 to 3 parts for 1 part of polyphosphorylamide.

In addition to the above essential constituents, ancillary materials which may be used according to the present invention include:

1. Water-soluble resins such as the water-soluble, alkyd resins described in copending application, Serial No. 51,296, filed September 25, 1948, and assigned to the same assignee as is the present application.

2. Suitable pigments to provide a range of colors and to provide covering power necessary in producing a suitable product may be employed.

3. Thinners and plasticizers such as are conventional to aid in the application of the paint composition may also be used. Certain polyhydric compounds useful as plasticizers are described in copending application, Serial No. 68,408, filed December 30, 1948.

4. Dispersing agents to stabilize the water emulsions. Alkyl-aryl sulfonates such as Santomerse may be employed.

5. Additional fire-retarding agents such as chlorinated paraffins, ammonium phosphate, chlorinated rubber (C. Ellis, supra, chap. 55).

The polyphosphorylamide as an essential constituent of the above compositions may be employed in the concentration range of 5% to 50% of the weight of solids in the coating composition. Relatively large proportions of polyphosphorylamide may be included in the formulation, since this material also serves to increase the covering power of the coating. The material is preferably employed as a fine powder to secure a uniform film.

The paint composition utilizing the polyphosphorylamide as set forth above is a self-extinguishing coating composition which offers protection against fire when the paint has been applied to or impregnated into wood or other cellulosic materials such as fiber board, paper, cloth and the like. The coating composition may also be applied to protect other combustible materials such as rubber and leather.

The following examples illustrate the general nature of the compositions and processes with which the invention is concerned, without, however, limiting the invention to the precise embodiments disclosed.

EXAMPLE 1

The polyphosphorylamide may be used in dispersions based upon water or other liquids. An embodiment of the invention utilized in a water base paint is set forth below:

| | Parts |
|---|---|
| Polyphosphorylamide | 6.4 |
| Titanium dioxide | 1.6 |
| Urea-formaldehyde condensation product (water-soluble) | 17.5 |
| Soap | 2.5 |
| Water | 19.5 |

The above water-base coating was found to be easily applied to wood and to provide a voluminous bulking effect in the form of a porous char when exposed to fire, thereby protecting the underlying wood-base. The present coating compositions were subjected to a fire test as described in the American Paint Journal Convention Daily, pages 8–30, November 6, 1946, which test was modified by the substitution of a gas microburner for the alcohol cup. Various pigments may be employed, and the resinous constituent may be any water-insoluble, nitrogenous resin which can be ground for water dispersion. Examples of such resin materials are Plaskon, and other urea-formaldehyde molding powders, Resimene and other melamine-formaldehyde resins.

Additional weather-proofing characteristics may be imparted to the compositions of the invention by adding further organic materials, such as alkyd or phenolic type resins, as set forth above. Pigments may also be employed to secure any desired color effects in the final flameproof coating.

The coating composition of the present invention may be applied by brushing, dipping, or spraying in accordance with the methods which are customary in the art.

EXAMPLE 2

| | Parts |
|---|---|
| Polyphosphorylamide | 10 |
| Titanium oxide | 4 |
| Urea - formaldehyde condensation product (water-soluble) | 25 |
| Resorcinol | 10 |
| Para-formaldehyde | 8 |
| Glycerine | 10 |
| Water | 36 |

The above formulation was tested and found to resist the propagation of a flame. The coating film, after drying, was a smooth, adherent film.

EXAMPLE 3

| | Parts |
|---|---|
| Polyphosphorylamide | 15 |
| Urea - formaldehyde condensation product (water-soluble) | 37 |
| Titanium oxide | 6 |
| Mannitol as a plasticizer | 21 |
| Water | 52 |

The above formulation was tested in comparison with the conventional diammonium phosphate treating compound and found to give the results shown below.

*Flame test (char area)—one coat of each on poplar boards*

| | As Applied | Scrubbed 40 Times | Scrubbed 4,000 Times |
|---|---|---|---|
| Composition A: Ammonium phosphate, urea, para-formaldehyde. | 3.5 sq. in. | bare board, burned readily. | |
| Composition B: Example 3 above. | 3.5 sq. in. | 3.5 sq. in. | 3.5 sq. in. |

The above data were obtained by making the standard fire tests on coated test panels which were subjected to scrubbing on a wear-test machine. This machine counted the number of strokes of a scrub brush mechanically traversing the test sample while a stream of water kept the test board wet. The composition, based upon polyphosphorylamide, showed a retention of fire-retarding properties, while the coating based upon the ammonium phosphate deteriorated completely when subjected to water and wear.

EXAMPLE 4

A formulation was made employing:

| | Per cent by weight |
|---|---|
| Polyphosphorylamide | 20 |
| Pigment (titanium dioxide) | 10 |
| Urea - formaldehyde condensation product (liquid) | 70 |

The mixture of these components gave an easily dispersible mixture when added to water to give a product of brushing consistency. When test panels were coated with this coating dispersion, it was found that an intumescing action occurred to protect the underlayer, and prevent further combustion.

In general, the polyphosphorylamide or other reaction products of ammonia and phosphoryl chloride may be employed in the range of 5% to 50%, and preferably from 18% to 50% by weight of the dry components; the pigment, 1% to 30%, and the aminoplast resin, 40% to 80%.

It has been found that the polyphosphorylamide is an essential constituent of water-base compositions intended to be applied as flameproof coatings. The polyphosphorylamide is not affected by the aqueous vehicle, since it is substantially insoluble in water. At the same time, it is readily dispersed in water and may easily be remixed to the desired consistency at the time of application.

This application contains subject matter in common with certain other applications assigned to the same assignee Serial No. 68,402, filed December 30, 1948, relating to the water-insoluble composition of matter resulting from the reaction of phosphoryl chloride and ammonia; Serial No. 68,404, filed December 30, 1948, relating to a flameproofing treatment for cotton by the application thereto of the water-insoluble reaction product of phosphoryl oxychloride and ammonia; Serial No. 68,405, filed December 30, 1948, relating to compositions comprising phenol-formaldehyde resins in combination with the water-insoluble reaction product of phosphoryl chloride and ammonia; Serial No. 68,406, filed December 30, 1948, relating to intumescing compositions comprising the combination of a nitrogen-containing resin in combination with the water-insoluble reaction product of phosphoryl chloride and ammonia; Serial No. 68,407, filed December 30, 1948, relating to water paints based upon the combination of the water-insoluble reaction product of phosphoryl chloride and ammonia together with water-soluble alkyd resins derived from the reaction of citric acid and glycerine; Serial No. 68,408, filed December 30, 1948, relating to water emulsion paints comprising the combination of a nitrogen-containing resin and the water-insoluble reaction product of phosphoryl chloride and ammonia together with polyhydroxy compounds such as pentaerythritol; Serial No. 68,409, filed December 30, 1948, relating to a coating composition comprising an organic solvent containing organic, film-forming resins in combination with the water-insoluble reaction product of phosphoryl chloride and ammonia; Serial No. 68,410, filed December 30, 1948, relating to the combination of the water-insoluble reaction product of phosphoryl chloride and ammonia together with chlorinated rubber; Serial No. 68,411, filed December 30, 1948, relating to flameproofed cloth having deposited thereon the combination of the water-insoluble reaction product of phosphoryl chloride and ammonia together with antimony oxide and polyvinyl chloride; Serial No. 136,135, filed December 30, 1949, relating to glowproofing compositions comprising the combination of the reaction product of phosphoryl chloride and ammonia together with antimony oxide and chlorinated paraffins; Serial No. 136,136, filed December 30, 1949, relating to compositions comprising the combination of the reaction product of phosphoryl chloride and ammonia together with compounds having free hydroxy radicals such as pentaerythritol.

It will be obvious to those skilled in the art that minor changes in the composition and the flameproofing process may be made without departing from the spirit and scope of the invention.

What I claim and desire to protect by Letters Patent of the United States is:

1. A fire-retarding, coating composition consisting of a dispersion of water, the water-insoluble reaction product of phosphoryl chloride and anhydrous ammonia, said water-insoluble product having a nitrogen/phosphorus ratio between 1.75:1 and 1.85:1 and being present to the extent of 5% to 50% by weight of the solid components, and a resin selected from the group consisting of amine-aldehyde and amide-aldehyde resins.

2. The process for protecting combustible materials against the propagation of a flame which comprises applying to said material a dispersion consisting of water, the water-insoluble reaction product of phosphoryl chloride and anhydrous ammonia, said water-insoluble product having a nitrogen/phosphorus ratio between 1.75:1 and 1.85:1, and being present to the extent of 5% to 50% by weight of the solid components, and a resin selected from the group consisting of amine-aldehyde and amide-aldehyde resins.

3. A fire-retarding, coating composition consisting of a dispersion of water, the water-insoluble reaction product of phosphoryl chloride and anhydrous ammonia, said water-insoluble product having a nitrogen/phosphorus ratio between 1.75:1 and 1.85:1, and being present to the extent of 5% to 50% by weight of the solid components and an amine-aldehyde resin.

4. A fire-retarding, coating composition consisting of a dispersion of water, the water-insoluble reaction product of phosphoryl chloride and anhydrous ammonia, said water-insoluble product having a nitrogen/phosphorus ratio between 1.75:1 and 1.85:1, and being present to the extent of 5% to 50% by weight of the solid components and an amide-aldehyde resin.

5. A fire-retarding, coating composition consisting of a dispersion of water, the water-insoluble reaction product of phosphoryl chloride and anhydrous ammonia, said water-insoluble product having a nitrogen/phosphorus ratio between 1.75:1 and 1.85:1, and being present to the extent of 5% to 50% by weight of the solid components, and a resin derived from the reaction of formaldehyde with urea.

MORRIS L. NIELSEN.

References Cited in the file of this patent

UNITED STATES PATENTS

| Number | Name | Date |
|---|---|---|
| 2,052,886 | Leroy | Sept. 1, 1936 |
| 2,163,085 | Cupery | June 20, 1939 |
| 2,413,163 | Bacon | Dec. 24, 1946 |
| 2,582,181 | Truhlar | Jan. 8, 1952 |

FOREIGN PATENTS

| Number | Country | Date |
|---|---|---|
| 181,547 | Switzerland | Mar. 16, 1936 |

OTHER REFERENCES

Mellor: Comprehensive Treatise on Inorganic and Theoretical Chemistry, vol. 8 (1928), pages 704 to 720.